US009953299B2

United States Patent
Kaplan et al.

(10) Patent No.: US 9,953,299 B2
(45) Date of Patent: Apr. 24, 2018

(54) SYSTEMS AND METHODS FOR SHARING IMAGE DATA

(71) Applicant: PowWow, Inc., San Francisco, CA (US)

(72) Inventors: Jonathan Kaplan, San Francisco, CA (US); Andrew Cohen, San Francisco, CA (US)

(73) Assignee: POWWOW, INC., San Francisco, CA (US)

( * ) Notice: Subject to any disclaimer, the term of this patent is extended or adjusted under 35 U.S.C. 154(b) by 428 days.

(21) Appl. No.: 14/097,167

(22) Filed: Dec. 4, 2013

(65) Prior Publication Data
US 2015/0156225 A1    Jun. 4, 2015

(51) Int. Cl.
G06Q 10/10 (2012.01)
H04L 29/06 (2006.01)
H04W 4/00 (2018.01)

(52) U.S. Cl.
CPC ......... *G06Q 10/101* (2013.01); *H04L 65/403* (2013.01); *H04L 67/42* (2013.01); *H04W 4/00* (2013.01)

(58) Field of Classification Search
CPC ...... H04L 65/403; H04W 4/00; G06Q 10/101
USPC ........................................ 717/101
See application file for complete search history.

(56) References Cited

U.S. PATENT DOCUMENTS

| | | | |
|---|---|---|---|
| 6,343,313 B1 | 1/2002 | Salesky et al. | |
| 6,691,154 B1 | 2/2004 | Zhu et al. | |
| 7,702,730 B2 | 4/2010 | Spataro et al. | |
| 2002/0113796 A1* | 8/2002 | Oshiyama | H04N 1/3876 345/581 |

(Continued)

FOREIGN PATENT DOCUMENTS

| | | |
|---|---|---|
| JP | 2000-067220 A | 3/2000 |
| JP | 2000-324437 A | 11/2000 |

(Continued)

OTHER PUBLICATIONS

PCT International Search Report for International application No. PCT/US2014/068507.*
*TeamViewer 8 Manual Meeting*; TeamViewer GmbH • Kuhnbergstraβe 16 D-73037 Göppingen; Rev 8.1-12/2012; pp. 1-61; http://www.teamviewer.com/en/help/firststeps.aspx.
International Search Report and Written Opinion dated Feb. 17, 2015, from corresponding International Patent Application No. PCT/US2014/068507, 10 total pages.
International Search Report and Written Opinion dated Mar. 23, 2015, from related International Patent Application No. PCT/US2014/068513, 9 pages.
PCT International Search Report and Written Opinion dated Oct. 18, 2016 in International Application No. PCT/US2016/040536. 12 pages.

(Continued)

*Primary Examiner* — Kevin Bates
*Assistant Examiner* — Chen-Liang Huang

(57) ABSTRACT

At least one server connects with clients via networks such that each client communicates using a different network. The server divides an image based on an application into portions. The server assigns version numbers to the portions such that each version number corresponds to a different portion. The server generates lists that include the version numbers, wherein each list corresponds to a different client. The server shares the image by transmitting image data to each client separately based on the respective list. The server receives update(s) for the image and identifies portion(s) that has changed based on the update. The server assigns an updated version number to the identified changed portion and generates updated lists that include the updated version numbers for the clients such that each updated list corresponds to a different client. The server transmits updated image data to each client separately based on the respective updated list.

21 Claims, 9 Drawing Sheets

(56) References Cited

U.S. PATENT DOCUMENTS

| | | |
|---|---|---|
| 2005/0240428 A1* | 10/2005 | Gabrick ............... G06Q 50/184 705/310 |
| 2006/0218548 A1 | 9/2006 | Mason et al. |
| 2008/0016186 A1 | 1/2008 | Ball |
| 2008/0104170 A1* | 5/2008 | Ananthanarayanan . H04L 67/06 709/204 |
| 2008/0141244 A1 | 6/2008 | Kelley |
| 2008/0155525 A1 | 6/2008 | Ho |
| 2008/0225842 A1* | 9/2008 | Goldfein ................ H04L 47/25 370/389 |
| 2009/0204711 A1* | 8/2009 | Binyamin ............... H04L 67/16 709/226 |
| 2009/0235353 A1 | 9/2009 | Ammerlaan et al. |
| 2010/0313179 A1* | 12/2010 | Groves ..................... G06F 8/34 717/101 |
| 2010/0329140 A1 | 12/2010 | Buford et al. |
| 2011/0123169 A1 | 5/2011 | Liu |
| 2011/0224811 A1 | 9/2011 | Lauwers et al. |
| 2011/0239117 A1 | 9/2011 | Sutton et al. |
| 2011/0276661 A1 | 11/2011 | Gujarathi et al. |
| 2012/0246631 A1 | 9/2012 | Chen et al. |
| 2012/0260232 A1 | 10/2012 | Hirsch et al. |
| 2012/0271902 A1* | 10/2012 | Baliga ................ H04L 43/0811 709/209 |
| 2013/0239009 A1 | 9/2013 | DeGrazia |
| 2014/0101664 A1 | 4/2014 | Inomata |
| 2014/0185950 A1* | 7/2014 | Saint Macary ........ H04N 19/91 382/251 |
| 2014/0258968 A1 | 9/2014 | Brown et al. |
| 2015/0036535 A1* | 2/2015 | Mosko ................. H04L 45/123 370/254 |
| 2015/0058461 A1 | 2/2015 | Guiditta et al. |
| 2015/0332029 A1* | 11/2015 | Coxe ................... H04L 63/0815 726/9 |

FOREIGN PATENT DOCUMENTS

| | | | |
|---|---|---|---|
| JP | 2013-105204 A | 5/2013 | |
| KR | 10-2009-0114759 A | 11/2009 | |
| KR | 20090114759 | * 11/2009 | ............. H04W 4/18 |

OTHER PUBLICATIONS

International Preliminary Report on Patentability dated Jun. 16, 2016 in International Application No. PCT/US14/68513. 7 pages.

International Preliminary Report on Patentability dated Jun. 16, 2016 in International Application No. PCT/US14/68507. 9 pages.

* cited by examiner

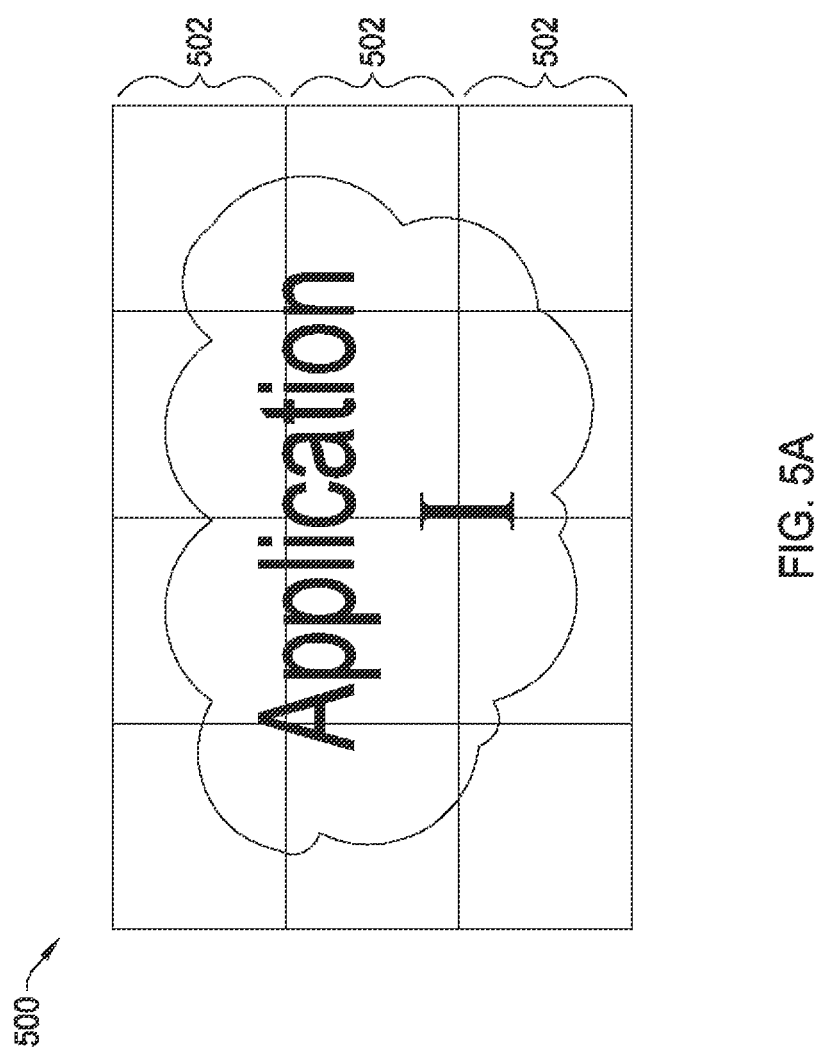

SYSTEMS AND METHODS FOR SHARING IMAGE DATA

BACKGROUND

In systems, such as computing systems, one or more software programs or applications that are being executed on a server or host computing device can be shared with remote clients or remote computing devices. For example, at least some known computing devices include browsers that support various mechanisms for receiving a continuous stream of data, such as image data, from the server, wherein the image data is based on the application being executed within the server. In a virtual desktop infrastructure (VDI), a virtual desktop may be accessible by one or more remote clients through a network, and a server may be used to provide various image data from the virtual desktop to one or more remote clients. More specifically, each remote client may include a browser or a web client that supports various methods for receiving a continuous stream of image data from the server.

Using such concepts, at least two known methods are commonly used to share software programs or applications. One method includes a remote desktop, wherein a remote client uses an application that is being hosted on a server or computing device over the network. When using such a method, the remote client has access to the application from anywhere. However, the access is limited to just the one remote client and other clients do not have access to the application. Another method includes web conferencing, wherein a server or a host computing device shares the application over various networks to remote clients. The remote clients can view an image based on the application and have limited access to take control of the image and/or edit the image. However, in such a method, the user or owner of the application has more direct access to the application than the remote clients and, therefore, the user or owner of the application is enabled with better performance of the application.

Moreover, when multiple remote clients are connected to the server via different types of networks, access to the data for each of the clients can vary. For example, when remote clients are connected to the server via different networks, each network may function at a respectively different speed. As such, the rate at which each client receives the data from the server can vary based on the network that each client is using. In addition, when one client has a relatively slower network speed than the other clients, the data being transmitted to each of the clients can be delayed. For example, when a server is transmitting any image update(s) to the remote clients, the clients may not be able to receive the update(s) until each of the clients has had an opportunity to accept the updates. As a result, if one client has a slower acceptance rate due to a slow network, then the other clients will not be able to receive the update until the slowest client can accept the data. As such, a slow client can adversely impact the other clients.

BRIEF DESCRIPTION

In one embodiment, a system is provided that facilitates the sharing of image data with remote clients by having contents for the image data be transmitted to each remote client separately. As such, the speed of the network by which one client is coupled to the server cannot impact the other clients. The system generally includes at least one server that is configured to be in communication with a plurality of clients via a plurality of networks such that each of the clients is in communication with the server via a respectively different network. The server is further configured to divide an image into a plurality of portions, wherein the image is based on an application being executed. The server is also configured to assign a plurality of version numbers to the portions such that each of the portions can have its own respectively different version number. The server is configured to generate a plurality of lists that include the assigned version numbers such that each of the lists corresponds to a different client. The server is configured to share the image with the clients by transmitting image data (or individual portions of the image data) to each of the clients separately, via the respective network, based on the respective list. When the server receives at least one update for the image, the server is configured to identify at least one of the portions that has changed based on the update and to assign an updated version number to the identified changed portion. The server is configured to generate a plurality of updated lists that include the updated version number for the clients such that each of the updated lists corresponds to a different client. The server is configured to transmit updated image data to each of the clients separately, via the respective network, based on the respective list.

In another embodiment, a method is provided. The method generally includes connecting at least one server to a plurality of clients via a plurality of networks such that each of the clients is in communication with the server via a different network. An image is divided into a plurality of portions, via the server, wherein the image is based on an application being executed. A plurality of version numbers are assigned to the portions such that each of the portions can have its own respectively different version number. A plurality of lists that include the assigned version numbers are generated by the server such that each of the lists corresponds to a different client. A plurality of sets of image data are generated based on the lists such that each of the sets of image data corresponds to a different list and to a different client. The image is shared with the clients by transmitting image data to each of the clients separately, via the respective network, based on the respective list. At least one update for the image is received by the server and the server identifies at least one of the portions that has changed based on the update. An updated version number is assigned to the identified changed portion and a plurality of updated lists that include the updated version number are generated for the clients such that each of the updated lists corresponds to a different client. Updated image data is transmitted to each of the clients separately, via the respective network, based on the respective updated list.

In yet another embodiment, at least one computer-readable storage medium having computer-executable instructions embodied thereon is provided. When executed by at least one processor, the computer-executable instructions generally cause the processor to connect to a plurality of clients via a plurality of networks such that each of the clients is in communication with the processor via a different network. The computer-executable instructions further cause the processor to divide an image into a plurality of portions, wherein the image is based on an application being executed and to assign a plurality of version numbers to the portions such that each of the portions can have its own respectively different version number. The computer-executable instructions also cause the processor to generate a plurality of lists that include the versions numbers such that each of the lists corresponds to a different client. The computer-executable instructions cause the processor to share the image with the clients by transmitting image data to each of the clients separately, via the respective network, based on the respective list. The computer-executable instructions also cause the processor to receive at least one update for the image and to identify at least one of the portions that has changed based on the update. The computer-executable instructions further cause the processor to assign an updated version number to the identified changed portion and to generate a plurality of updated lists that include the updated version number for the clients such that each of the updated lists corresponds to a different client. The computer-executable instructions also cause the processor to transmit updated image data to each of the clients separately, via the respective network, based on the respective updated list.

BRIEF DESCRIPTION OF THE DRAWINGS

FIGS. 5A and 5B are each block diagrams of an exemplary output of an image that is generated by the one of the servers shown in FIG. 1.

DETAILED DESCRIPTION

Figure 1:
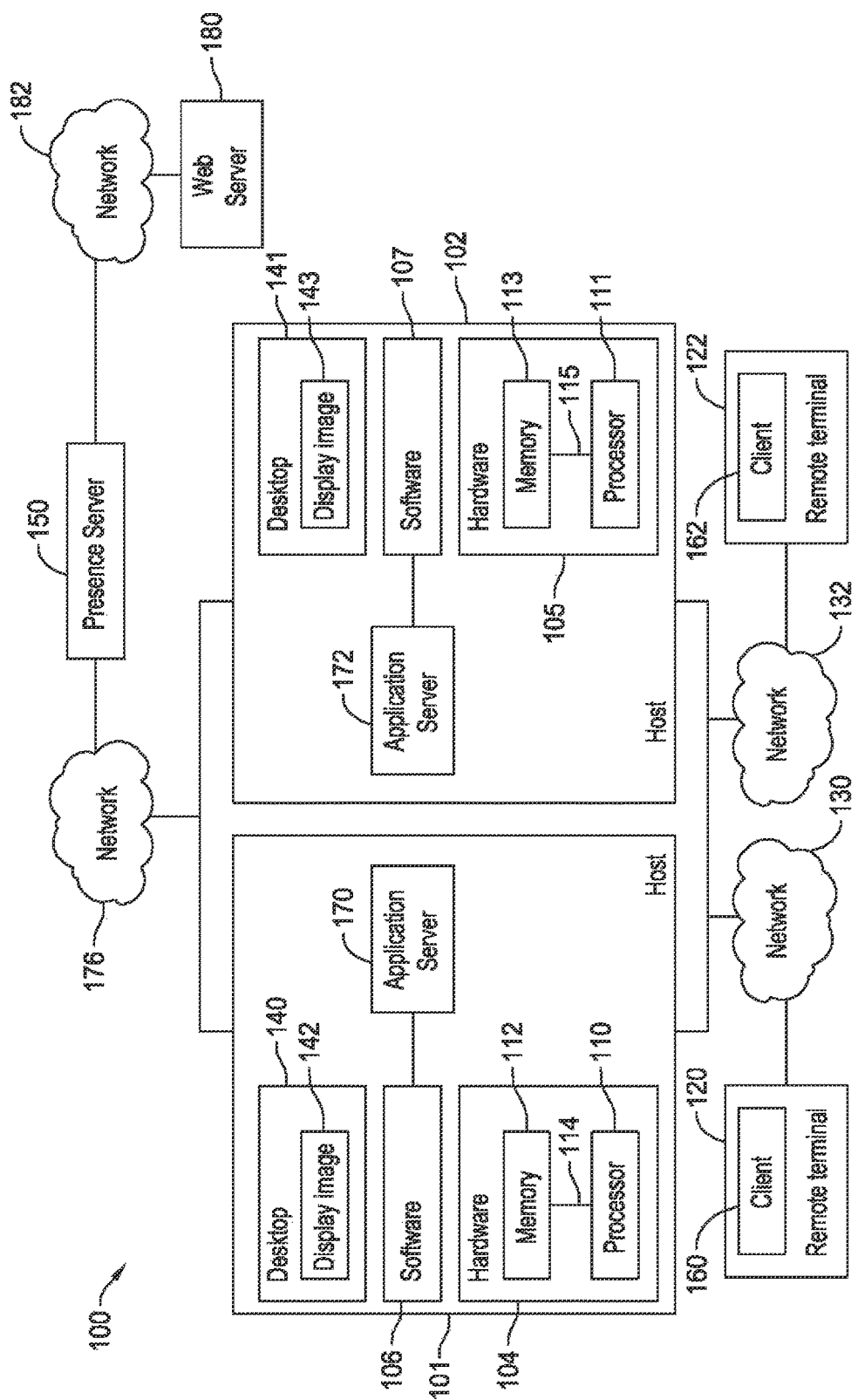
FIG. 1 is a block diagram of an exemplary system having one or more servers in communication with one or more clients.

FIG. 1 illustrates an exemplary system 100 that includes one or more physical computer systems or hosts, such as host 101 and host 102. In the some embodiments, each host 101 and 102 includes hardware units 104 and 105, respectively, and software 106 and 107, respectively. Software 106 and 107 run on hardware units 104 and 105, respectively, such that various applications or programs can be executed on hardware units 104 and 105 by way of respective software 106 and 107. In some embodiments, the functions of software 106 and 107 can be implemented directly in respective hardware units 104 and 105, e.g., as a system-on-a-chip, firmware, field-programmable gate array (FPGA), etc. In some embodiments, hardware units 104 and 105 each includes one or more processors, such as processor 110 and processor 111, respectively. In some embodiments, processors 110 and 111 are each an execution unit, or "core," on a microprocessor chip. In some embodiments, processors 110 and 111 may each include a processing unit, such as, without limitation, an integrated circuit (IC), an application specific integrated circuit (ASIC), a microcomputer, a programmable logic controller (PLC), and/or any other programmable circuit. Alternatively, processors 110 and 111 may each include multiple processing units (e.g., in a multi-core configuration). The above examples are exemplary only, and, thus, are not intended to limit in any way the definition and/or meaning of the term "processor."

Each hardware unit 104 and 105 also includes a system memory 112 and 113, respectively, wherein each memory 112 and 113 is coupled to respective processor 110 and 111 via a system bus 114 and 115, respectively. Each memory 112 and 113 can be a general volatile random access memory (RAM). For example, each hardware unit 104, 105 can include a 32 bit microcomputer with 2 Mbit ROM and 64 Kbit RAM. Each memory 112 can also be a read-only memory (ROM), a network interface (NIC), and/or other device(s).

In some embodiments, one or more end users may connect to, and interact with, host 101 and/or host 102 by using separate remote terminals. For example, two different end users in different locations can connect to host 101 and/or 102 by each using separate remote terminals 120 and 122. Each remote terminal 120 and 122 can be capable of communicating with host 101 and/or host 102 via separate networks 130 and 132, respectively. Each network 130 and 132 can be the Internet, a local area network (LAN), a wide area network (WAN), a personal area network (PAN), or any combination thereof, and each network 130 and 132 can transmit information between host 101 and/or host 102 and remote terminal terminals 120 and 122, respectively, at different rates or speeds. Remote terminals 120 and 122 can each be a desktop computer, laptop, mobile device, tablet, thin client, or other device having a communications interface. Each remote terminal 120 and 122 can also be capable of displaying applications running inside host 101 and/or host 101 to the end user using a computer display (not shown) or other output device. In some embodiments, each remote terminal 120 and 122 can also be capable of receiving user input from the respective end user and transmitting the received user input to host 101 and/or host 102.

In some embodiments, each host 101 and 102 can output at least one desktop, such as desktop 140 and desktop 141, respectively, to a user of respective host 101 and 102. Desktops 140 and 141 can each be an interactive user environment provided by an operating system and/or applications running within respective host 101 and 102, and generally includes one or more screens or display images, such as display image 142 and display image 143, respectively, but may include other outputs, such as audio, indicator lamps, tactile feedback, etc. Each desktop 140 and 141 can also accept input from the user in the form of device inputs, such as keyboard and mouse inputs. In some embodiments, each desktop 140 and 141 can also accept simulated inputs, such as simulated keyboard and mouse inputs. In addition to user input and/or output, each desktop 140 and 141 can send and receive device data, such as input and/or output for a FLASH memory device local to the user, or to a local printer. In some embodiments, each display image 142 and 143 can be presented to each end user on the computer displays of remote terminals 120 and 122.

In some embodiments, each host 101 and 102 includes at least one server, such as application server 170 and application server 172, respectively, that are each in communication with respective software 106 and 107. Each application server 170 and 172 can also be in communication with each remote terminal 120 and 122. For example, in some embodiments, each application server 170 and 172 can be in communication with a client in each of the remote terminals 120 and 122, such as clients 160 and 162, respectively. Each application server 170 and 172 can be in communication with clients 160 and 162 via networks 130 and 132, respectively. In some embodiments, each client 160 and 162 can be a web client or web browser that is configured to run on respective remote terminals 120 and 122 and is configured to connect to application servers 170 and 172 as appropriate.

In some embodiments, each application server 170 and 172 can be implemented on a stand-alone server (not shown) and/or connected to one or more additional servers. For example, in some embodiments, application servers 170 and 172 can be connected to a presence server 150 via network 176. Network 176 can be the Internet, a LAN, a WAN, PAN, or any combination thereof, and network 176 can transmit information between presence server 150 and application servers 170 and 172. In some embodiments, presence server 150 can also be connected to a web server 180 via a network 182. In some embodiments, web server 180 and presence server 150 can be hosted together. Network 182 can also be the Internet, a LAN, a WAN, or any combination thereof, and can transmit information between presence server 150 and web server 180. Moreover, in some embodiments, presence server 150 and/or web server 180 can also be in direct communication with clients 160 and 162 via the respective networks 130 and 132. Web server 180 can also be in direct communication with application servers 170 and 172 in some embodiments.

System 100 can be implemented on one or more physical enterprise or desktop computer system, such as a work or home computer that is remotely accessed when travelling. Alternatively, system 100 may be implemented on a virtual desktop infrastructure (VDI) that has a plurality of virtual machines (VMs) (not shown) on host 102 (such as an enterprise computer system). For example, in some embodiments, application servers 170 and 172 can be connected to a plurality of VMs on respective host 101 and 102. In a VDI deployment, each desktop 140 and 141 can be exported from a corresponding one of the VMs to remote terminals 120 and 122. In such an embodiment, software implemented processes 106 and 107 can each be virtualization software and the VMs can be executing on respective hardware 104 and 105 by way of the virtualization software. It should therefore be understood that the present disclosure can be implemented in a variety of contexts, but may be particularly useful wherever graphical user interface remote displaying is implemented.

During operation of system 100, as explained in more detail below with respect to FIGS. 2-7, application servers 170 and/or 172 are able to efficiently share image data with each client 160 and 162, such that a slow network connection used to transmit image updates to one of the clients cannot impact transmission of the image updates to the other client(s). In some embodiments, presence server 150 directs one of the application servers 170 and 172 to execute the application. In some embodiments, image data based on the application being executed by servers 170 and 172 can be presented on displays 142 and 143, respectively, to a user of respective hosts 101 and 102. Contents for the image data can be transmitted to each client 160 and 162 separately via the respective network connections 130 and 132. For example, as explained in more detail below, presence server 150 selects one of the servers 170 and 172 to execute the application therein. Then the selected server processes the image such that the contents of the image can be transmitted to clients 160 and 162.

For example, in some embodiments, the selected server divides the image into a plurality of portions to form a grid and assigns a version number to each of the portions such that each portion has a respective version number. The version number, for example, refers to a current state or version of a particular portion of the image. Initial lists that include the version numbers for each respective portion can then be created by the selected server such that each client will receive image data based on its own initial list. For example, a separate initial list is created for each client 160 and 162 and a set of image data (i.e., image information, such as meta data) is generated for each client 160 and 162 based on the respective initial list. The sets of image data are then separately transmitted to each respective client 160 and 162 via respective networks 130 and 132. As the underlying image changes, the selected server can receives update(s) for the image from the underlying application data stream. The selected server then assigns new or updated version numbers to the changed portions of the image based on the update(s) and generates a separate updated list for each client 160 and 162. New sets of updated image portion data are then generated for each portion of the image that has changed, and added to, the respective updated list for each respective client. The new sets of updated image portion data corresponding to each changed portion are then separately transmitted to each respective client 160 and 162 via respective networks 130 and 132.

For any given portion of the image, the updated list can at most include a single (latest) version number for that portion. Thus, if a portion of the image is changed twice before that portion of the image data is sent to a given client, only the latest version of the changed image data for that portion is sent to that client. This can reduce the total amount of data sent to clients which are connected by slow networks or have slow processing capacity. For each client list, when the server sends a client a portion of an image (or a set of portions of the image) corresponding to a given change, the server removes that portion (or set of portions) of the image from the list corresponding to that client.

Initially, all of the clients can receive the same initial version of the image, and the initial updated list for each client can be the same. As each client can receive image updates at a respectively different rate, and the received portions are removed from the updated list for each client at different times upon completion of receipt, the updated lists for each respective client can become different from each other over time (especially if the changes to the image occur frequently).

As explained in more detail below with respect to FIGS. 2-7, by transmitting the sets of the changed image portion data separately to each client 160 and 162 based on the respective lists, system 100 is enabled to prevent a client having a slower network from impacting the other clients. For example, as explained in more detail below, each client 160 and 162 receives a set of image data based on separate initial lists and updated lists for the image and are enabled to display the updated images accordingly. Therefore, even if network 132 is slower than network 130, client 160 would receive its own set of data based on separate lists and would not be impacted, regardless of whether client 162 has received its data. Accordingly, system 100 is able to efficiently share image data.

Figure 2:
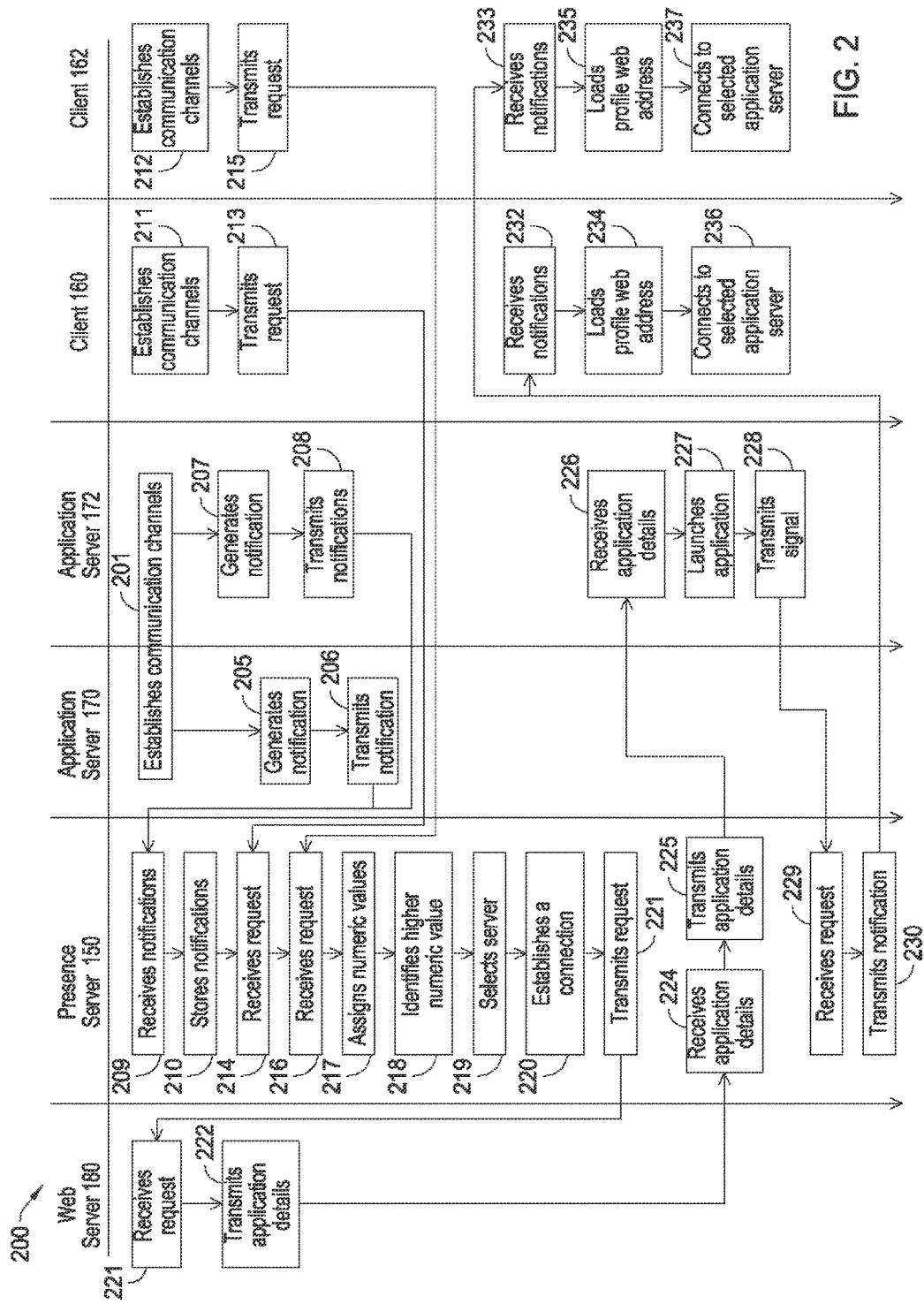
FIG. 2 is a swimlane diagram of a first part of an exemplary method for sharing image data between at least one of the servers and the clients shown in FIG. 1.

FIG. 2 is a swimlane diagram 200 of a first part of an exemplary method for sharing image data using system 100 (shown in FIG. 1). This method may be embodied within a plurality of computer-executable instructions stored in one or more memories, such as one or more computer-readable storage mediums. Computer storage mediums include non-transitory media and may include volatile and nonvolatile, removable and non-removable mediums implemented in any method or technology for storage of information such as computer-readable instructions, data structures, program modules or other data. The instructions may be executed by one or more processors to perform the functions described herein.

In operation 201, application server 170 and application server 172 establishes communication channels with presence server via network 176 (shown in FIG. 1). The channel(s) facilitate communication between application servers 170 and 172 and presence server 150, such that data can be shared between application servers 170 and 172 and presence server 150. In some embodiments, these connections are established automatically when the application starts up, and may be automatically re-established as needed when the connection is lost or the server restarts. In some embodiments, the connections are persistent status connections that application servers 170 and 172 maintain with presence server 150. The persistent status connections can be used by presence server 150 to detect the current state of each of the application servers 170 and 172 and can be used by presence server 150 to transmit requests to application servers 170 and 172. As such, presence server 150 can be provided with up-to-date information regarding application servers 170 and 172.

In operation 205, application server 170 generates the notification or the advertisement and transmits the notification to presence server 150 in operation 206. Similarly, in operation 207, application server 172 generates its own notification or advertisement and transmits the notification to presence server 150 in operation 208. As such, each notification corresponds to a different application server. Presence server 150 receives the notifications from each application server 170 and 172 in operation 209 and stores the notifications received in operation 210.

Figure 3:
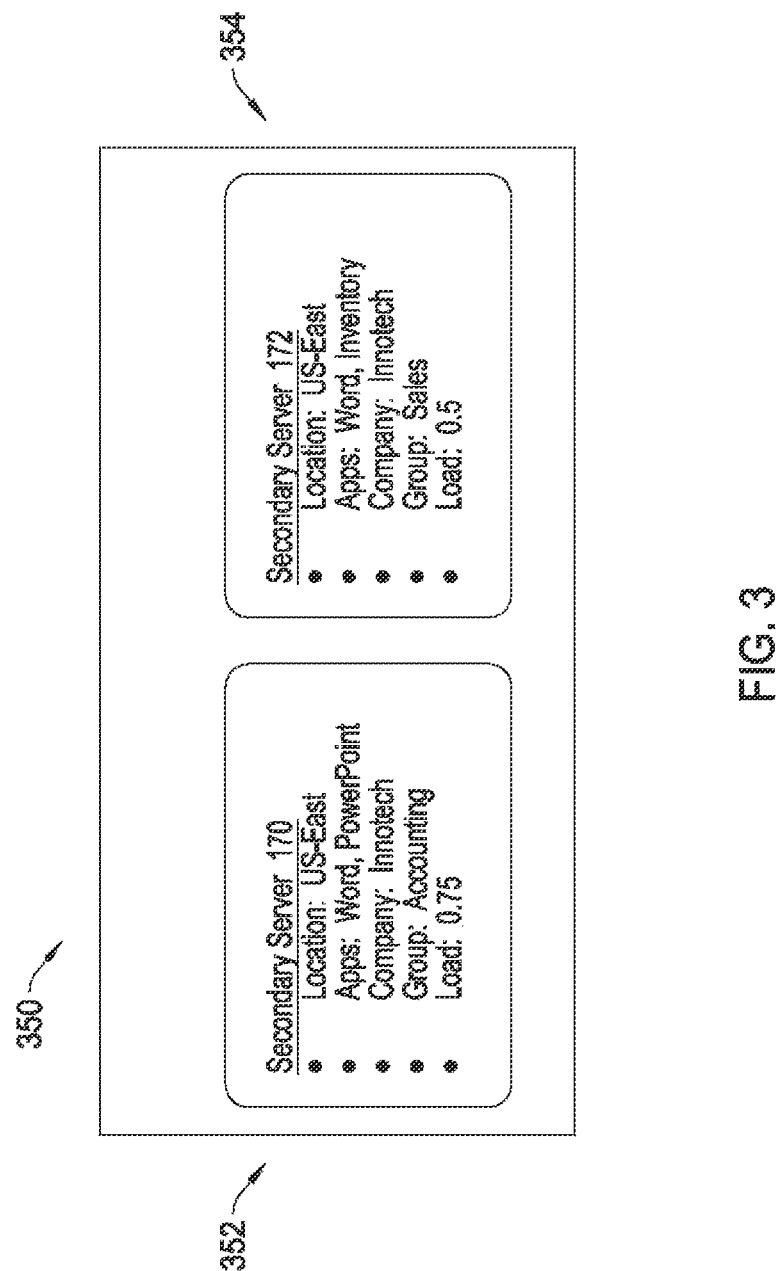
FIG. 3 is a block diagram of an exemplary output of a set of a plurality of notifications that are received by one of the servers in the system shown in FIG. 1.

In some embodiments, the notifications that presence server 150 receives from application servers 170 and 172 provides various information about the respective servers. For example, an exemplary output 350 of a set of exemplary notifications that presence server 150 can receive from application servers 170 and 172 is illustrated in FIG. 3. Referring to FIG. 3, output 350 includes a notification 352 that is generated and received from application server 170 and a notification 354 that is generated and received from application server 172. In some embodiments, each notification 352 and 354 includes at least one parameter of the respective server. As shown in FIG. 3, the parameters can include standard elements of each of the application servers 170 and 172. The standard elements include, but are not limited to, the location of the server, available applications within the server, groups, and the load on the server. As described above, presence server 150 is in persistent communication with application servers 170 and 172 and can be provided with up-to-date information regarding application servers 170 and 172. As such, if there are any changes to the application servers 170 and 172, new notifications can be generated and transmitted by application servers 170 and 172 to presence server 150.

Referring to FIG. 2, in operation 211, client 160 establishes one or more communication channels with presence server 150 via network 130 (shown in FIG. 1), wherein the channel(s) facilitate communication between client 160 and presence server 150 such that data can be shared between presence server 150 and client 160. Similarly, in operation 212, client 162 establishes one or more communication channels with presence server 150 via network 132 (shown in FIG. 1), wherein the channel(s) facilitate communication between client 162 and presence server 150 such that data can be shared between presence server 150 and client 162. In operation 213, client 160 transmits a request to presence server 160, wherein the request corresponds to a request to launch an application or program. Presence server 150 receives the request in operation 214. Similarly, in operation 215, client 162 transmits a request to presence server 160, wherein the request also corresponds to a request for the execution of the same application and to receive image data based on the execution of the application. Presence server 150 receives the request from client 162 in operation 216.

In some embodiments, presence server 150 does not have the application contained therein and, instead, manages access to a large number of applications that are contained within other servers, such as application servers 170 and 172. As such, upon receiving the requests, presence server 150 can identify which one of the application servers to have execute the application based on the notifications received from each of the application servers 170 and 172. In operation 217, presence server 150 assigns numeric values to each of the most recent and updated notifications that are received from secondary servers 170 and 172. For example, in some embodiments, the numeric values can be based on an extensible set of constraint variables or limitations of the clients 160 and 162 and/or of the application servers 170 and 172.

In some embodiments, any limitations or constraints for the clients 160 and 162 can be determined by presence server 150 at the time the presence server 150 receives requests from each client 160 and 162. For example, when the requests are received from clients 160 and 162 in respective operations 204 and 206 above, information or various fields about each of the clients 160 and 162 can be provided, such as the location of the client, maximum load the client can take, and the particular application the client wants to receive. Accordingly, presence server 150 can use the information or fields about each client 160 and 162 to determine constraints.

Similarly, any limitations or constraints for the application servers 170 and 172 can be determined by presence server 150 when presence server 150 receives the notifications from application servers 170 and 172 in operation 215 above, as the notifications provide information regarding various parameters or fields of each corresponding application server. For example, one constraint can be based on the loads of each of the application servers 170 and 172, as the load would identify whether any of the servers have capacity to execute an application.

By considering the various constraints about the clients 160 and 162 and/or the application servers 170 and 172, presence server 150 can determine constraint variables that can be used to determine the numeric values that are to be assigned to each of the application servers 170 and 172. In some embodiments, the constraint variables can include, but are not limited to, an operational field, an initialization function, and/or a scoring function. The operational field can be the field that the constraint operates on and the initialization function can be used to configure the constraint. In some embodiments, the initialization function depends on the type of values being compared. For example, if the location of a server is being used, the initialization function would take into account the location of the server. The scoring function would then take the location of the client and compare it to the location of the server. For a different constraint, such as the server load, the initialization would be different. For the latter constraint, the initialization function would be based on the load of the server, and the scoring function would compare the server load to the client's requested maximum load.

In some embodiments, after the constraint is configured, the numeric value is determined using the scoring function. In some embodiments, the scoring function can be a summation of all the determined constraints to form a total score for each of the application servers 170 and 172 (i.e., the numeric value). In some embodiments, the constraints may result in a numeric value of "No Match", which means that the given server cannot match the constraints no matter what other values are present. Accordingly, the numeric value that is assigned to each application server 170 and 172 is based on all the constraints that apply to the field or information provided by clients 160 and 162 and/or application servers 170 and 172.

After numeric values have been assigned to application servers 170 and 172, then presence server 150 identifies which of the servers 170 and 172 has the higher numeric value in operation 218. In operation 219, presence server 150 selects the server with the higher numeric value to execute the application. In the exemplary embodiment, application server is identified as having the higher numeric value and is, therefore, selected. For example, in the exemplary embodiment, application server 172 has a lower load. As described above, the load of the server is considered for a determination of the constraint variable. A higher load will decrease the numeric value of the corresponding server. As such, servers with lower loads will be picked more frequently such that the load between servers can be substantially evenly distributed.

While the exemplary embodiment illustrates the application being executed by one of the secondary servers, the application can instead be contained within presence server 150 and presence server 150 can execute the application directly therein in other embodiments.

Prior to the execution of the application, system 100 is configured such that the profiles of the application can be configured. For example, after the server has been selected, in operation 220, presence server 150 establishes a connection with web server 180 via network 182 (shown in FIG. 1). In operation 220, presence server 150 transmits a request to web server 180, wherein the request is for the details of the application. In some embodiments, the details of the application includes the profile information of the application, such as the launch descriptor for the application. Web server 180 receives the request in operation 222. In operation 223, web server 180 transmits the details of the application to presence server 150. In operation 224, presence server 150 receives the details of the application.

In operation 225, presence server 150 transmits details of the application to the selected application server (i.e., server 172). In operation 226, application server 172 receives the details of the application. In operation 227, application server 172 launches the application. In operation 228, application server 172 transmits a signal to presence server 150, wherein the signal indicates that the application has been launched. Presence server 150 receives the signal in operation 229. In operation 230, presence server 150 transmits a notification to clients 160 and 162 that the application has launched. Clients 160 and 162 receive the notifications in operations 232 and 233, respectively. In some embodiments, the notifications include the details of the application, such as the profile web address (i.e., profile uniform resource locator (URL)). In some embodiments, the URL provided includes the URL to receive the image data for the application as well as the profile URL for configuring the application on clients 160 and 162.

In operation 234, client 160 loads the received profile web address and, similarly, in operation 235, client 162 loads the received profile web address. As such clients 160 and 162 are enabled to configure the application. Then, client 160 and client 162 each connect to the selected application server (i.e., application server 172) in operation 236 and operation 237, respectively. During the connection, both the application on application server 172 and the container (not shown) running on remote terminals 120 and 122 (shown in FIG. 1) are configured based on the same profile. They can be configured based on the same profile because application server 172 and clients 160 and 162 received the same details of the application from web server 180.

In some embodiments, the details of the application, such as the profile information, is communicated in a JavaScript Object Notation (JSON) format. In some embodiments, the profile information enables various information to be configured, such as gesture mapping, keyboard mapping, screen configuration, document integration, and display information.

The gesture mapping can include, for a touch device, the process by which touch events are translated into native events for the application. The process includes, for example, the process to map from a gesture to a key press or a sequence of key presses. The process could also include more advanced functions, such as mapping between a zoom gesture on a device and the underlying zoom capability in the application.

The keyboard mapping can include, for a device with an extensible keyboard, extra keys that can be added to the keyboard to replace missing keys or add accelerators. Such extra keys can start a single event or a sequence of key events, or can be tied into the underlying capabilities of the device.

In some embodiments, screen configuration includes having the screen be configured to control the area of the screen that can be grabbed for each application. Document integration, for the applications that use documents, can include the integration between the application and document stores. Factors to consider for the integration includes whether the application can create new files, whether the application can open existing files, and the types of files that can be opened by the application. Display information can include the profile containing information about aspects of the display of the application in various computing devices or systems, such as remote terminals 160 and 162 and/or host 102 (shown in FIG. 1). The aspects of the display can include the icons and the texts that are displayed for the application.

While not shown in FIG. 2, in some embodiments, system 100 is enabled to set up and configure the application via a web interface such as by using the systems and methods described in co-pending U.S. patent application Ser. No. 14/097,195 entitled SYSTEMS AND METHODS TO CONFIGURE APPLICATIONS filed Dec. 4, 2013, which is incorporated herein by reference in its entirety.

Figure 4:
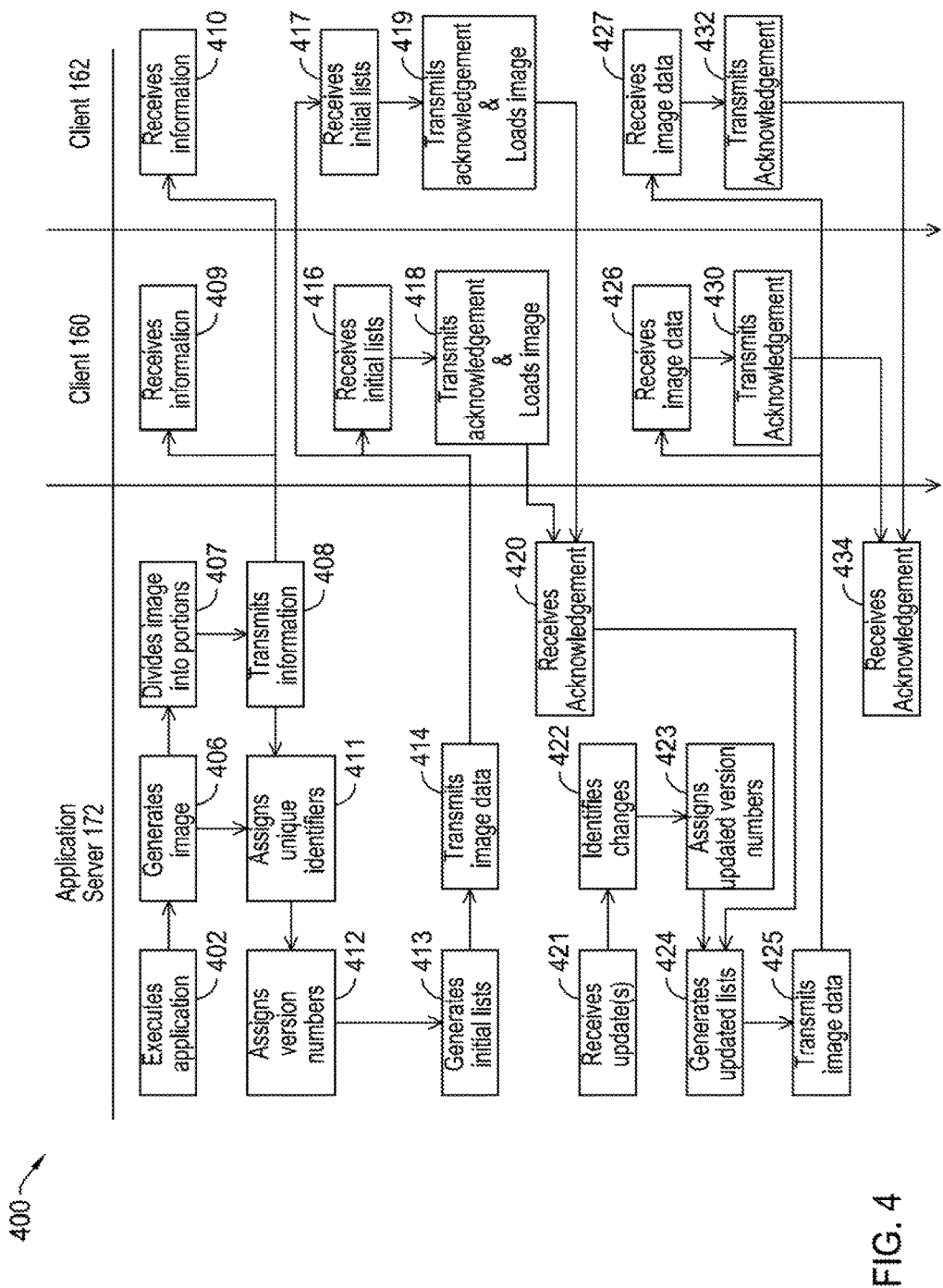
FIG. 4 is a swimlane diagram of a second part of the method for sharing image data shown in FIG. 2.

When profile configurations are completed, the application is executed and the image data based on the application can be shared. For example, FIG. 4 illustrates a swimlane diagram 400 of the second part and continuation of the exemplary method (shown in FIG. 2) for sharing image data using system 100 (shown in FIG. 1). In operation 402, the selected server (i.e., application server 172) executes the application. In some embodiments, as described herein, upon execution of the application, application server 172 can directly transmit the image data that is based on the application to each client 160 and 162. Alternatively, in other embodiments, application server 172 can transmit the image data to presence server 150 (shown in FIGS. 1 and 2) such that presence server 150 can transmit the image data to clients 160 and 162. Regardless of whether application server 172 or presence server 150 transmits the image data to clients 160 and 162, both types of servers will process the image data and transmit the image data via the same operational steps described below.

For example, upon execution of the application, application server 172 then generates an image in operation 406. In operation 407, application server 172 divides the image into a plurality of portions. For example, FIG. 5A illustrates an exemplary output of an image 500, wherein image 500 has been divided into a plurality of portions 502 (i.e., a grid). In some embodiments, each portion 502 can be a shaped as a square, wherein each square portion has the same dimensions. For example the length and width of each portion can be substantially the same value for each portion 502. In other embodiments, each portion 502 can be divided into different shapes, wherein each portion can have different dimensions.

Figure 5B:
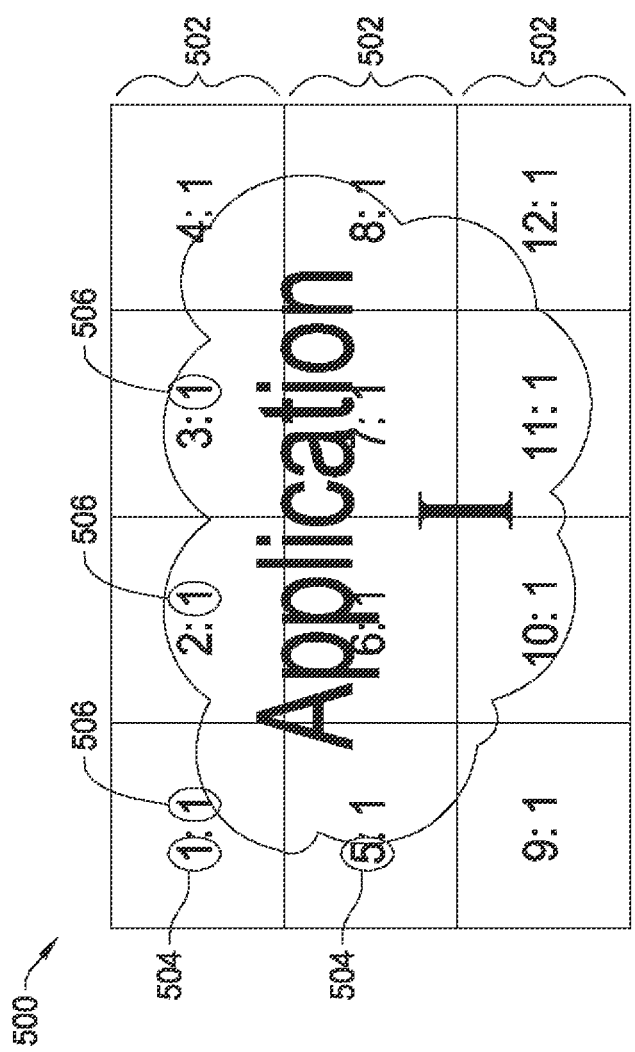

Referring to FIG. 4, application server 172 transmits information, such as the size of each of the portions or the total size of the image to clients 160 and 162 in operation 408. Client 160 and client 162 receive the information in operation 409 and 410, respectively. In operation 411, application server 172 assigns a plurality of unique identifiers to the portions such that each unique identifier is assigned to a different portion. For example, FIG. 5B illustrates image 500, wherein a unique identifier 504 has been assigned to each portion 502. In some embodiments, each unique identifier 504 is numerical value assigned to each portion 502, such as 1, 2, 3, etc. In some embodiments, unique identifier 504 can be an alphabetical value, such as a, b, c, etc. As shown in FIG. 5B, each portion 502 has a different unique identifier 504.

Referring to FIG. 4, in operation 412, application server 150 assigns version numbers to the portions such that each portion has a respective version number. For example, referring to FIG. 5B, each portion 502 also includes a version number 506. In some embodiments, version number 506 is the version of image 500 or a version of at least one portion 502 of image 500. For example, in FIG. 5B, image 500 is the initial image and, as such, each version number 502 is equal to the number "1".

Figure 6:
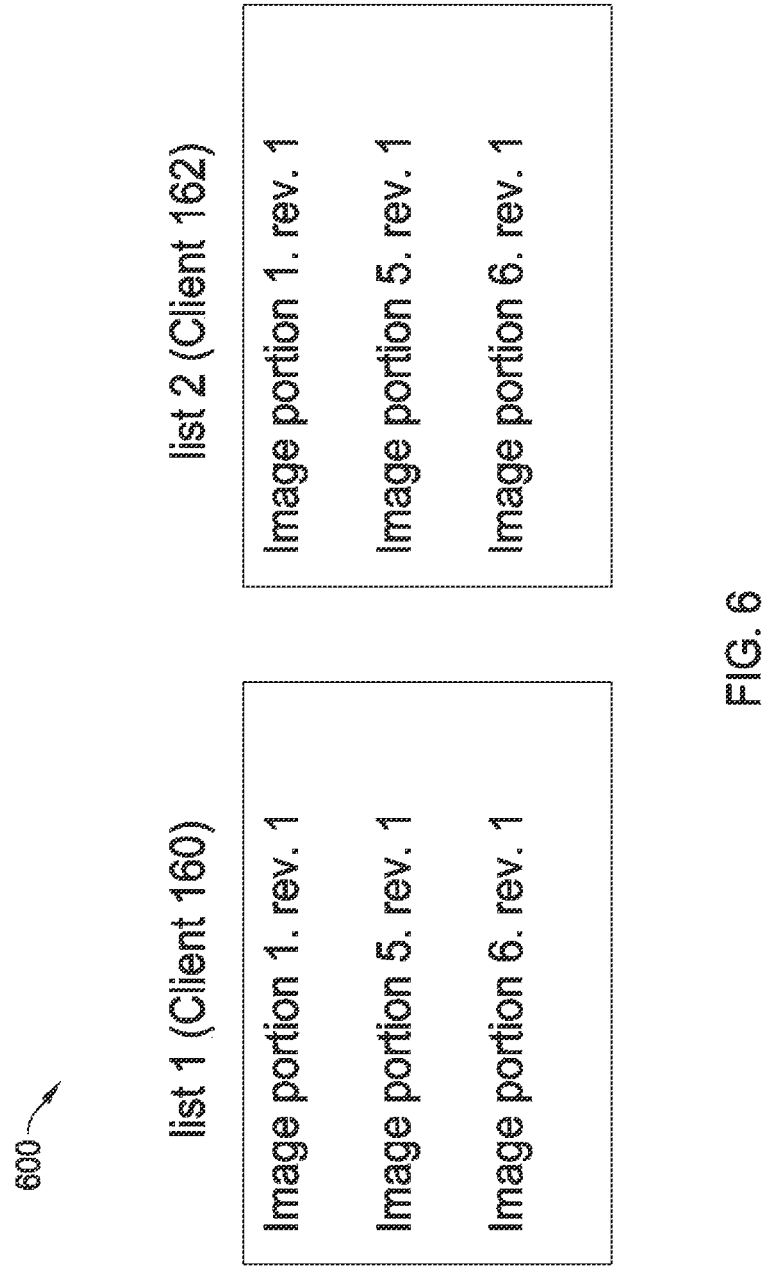
FIG. 6 is a block diagram of a portion of an exemplary output of a plurality of lists that are based on the image shown in FIGS. 5A and 5B.

Referring to FIG. 4, after version numbers have been assigned, then application server 172 generates an initial list for each of the clients 160 and 162 in operation 413 such that each list corresponds to a different client. For example, FIG. 6 illustrates a portion of an exemplary output 600 having list 1 that is generated for client 160 and list 2 that is generated for client 162, and each of list 1 and list 2 are based on image 500 (shown in FIGS. 5A and 5B). In some embodiments, each list includes the unique identifier for the image portion 504 on the left hand side of the list and the assigned version number 506 corresponding to each portion on the right hand side of the list.

Referring to FIG. 4, in operation 414, application server 172 transmits image data (i.e., meta data, such as the location of the image or image portion and the version number) to clients 160 and 161 separately, via respective networks 130 and 132, based on the list that is generated for each client. For example, application server 172 would transmit the image data to client 160 in the order specified by the initial list that was created for client 160. For example, if the initial list for client 160 was (1, 5, 6), application server 172 would send client 160 the data for the image portion 1, along with the x and y coordinates of the image portion and the version number for the image. Application server 172 would then transmit the pertinent information for image portion 5 and then image portion 6. This approach is done to avoid a round trip to application server 172: Similarly, application server 172 would transmit the image data to client 162 in the order specified by the initial list that was created for client 162.

In some embodiment, to handle clients 160 and 162 updating at different speeds and different network transmission rates, application server 172 only sends each individual client as much image data as that client can receive and process. Application server 172, in some embodiments, can determine how much data to send the client based on standard network protocols such as transmission control protocol (TCP). As such, in the example described above, application server 172 might send information for image portion 1 and image portion 5, and then stop sending information because the client has not acknowledged receiving information for those image portions yet. When the client acknowledges receipt of the information for image portion 5, the server would then send information for image portion 6.

In operation 416, client 160 receives its corresponding image data and, in operation 417, client 162 receives its corresponding data. In the exemplary embodiment, each client 160 and 162 receives and accepts its corresponding image data based on the speed of respective network 130 and 132. For example, if network 130 is faster than network 132, then client 160 will receive its image data prior to client 162 receiving its image data. After receiving its respective image data, client 160 transmits acknowledgement of receipt to application server 172 and loads the image based on the information received in operation 418. Similarly, client 162 transmits acknowledgement of receipt to application server 172 and loads the image based on the information provided in operation 419. Application server 172 receives acknowledgements in operation 420.

Figure 7:
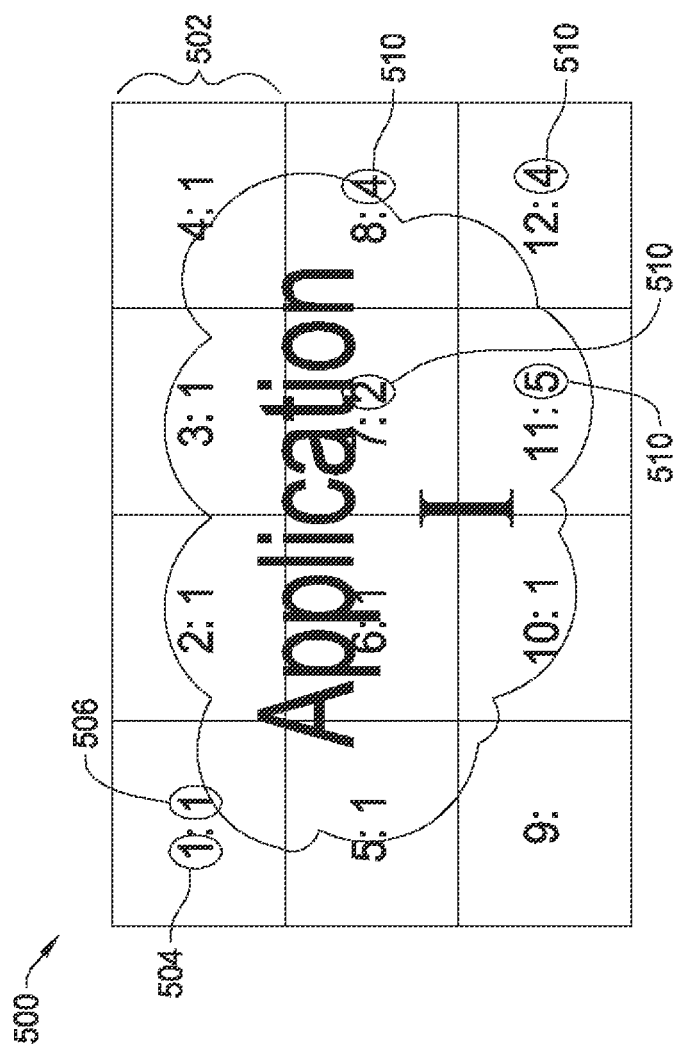
FIG. 7 is a block diagram of an exemplary output of an updated version of the image shown in FIGS. 5A and 5B.

As the application is being executed, application server 172 receives at least one update for the image in operation 421 from the data stream. When an update is received, application server 172 identifies the portion(s) of the divided image that have changed in operation 422. In operation 423, presence server 150 assigns updated version numbers to the identified changed portions of the divided image. For example, FIG. 7 illustrates an updated version of image 500 having portions 502 after at least one portion of the image has been updated at least four times. Each portion 502 includes the unique identifier 504 and one of the assigned initial version numbers 506 or assigned updated version numbers 510. As shown in FIG. 7, portion 502 having the unique identifier number "7" has changed from the initial version number "1" to updated version number "2". Portion 502 having the unique identifier number "8" has changed from a previous version number to an updated version number "4". Similarly, portion 502 having the unique identifier number "12" has changed from a previous version number to an updated version number "4". Portion 502 having the unique identifier number 11 has changed from a previous version number to an updated version number "5".

Figure 8:
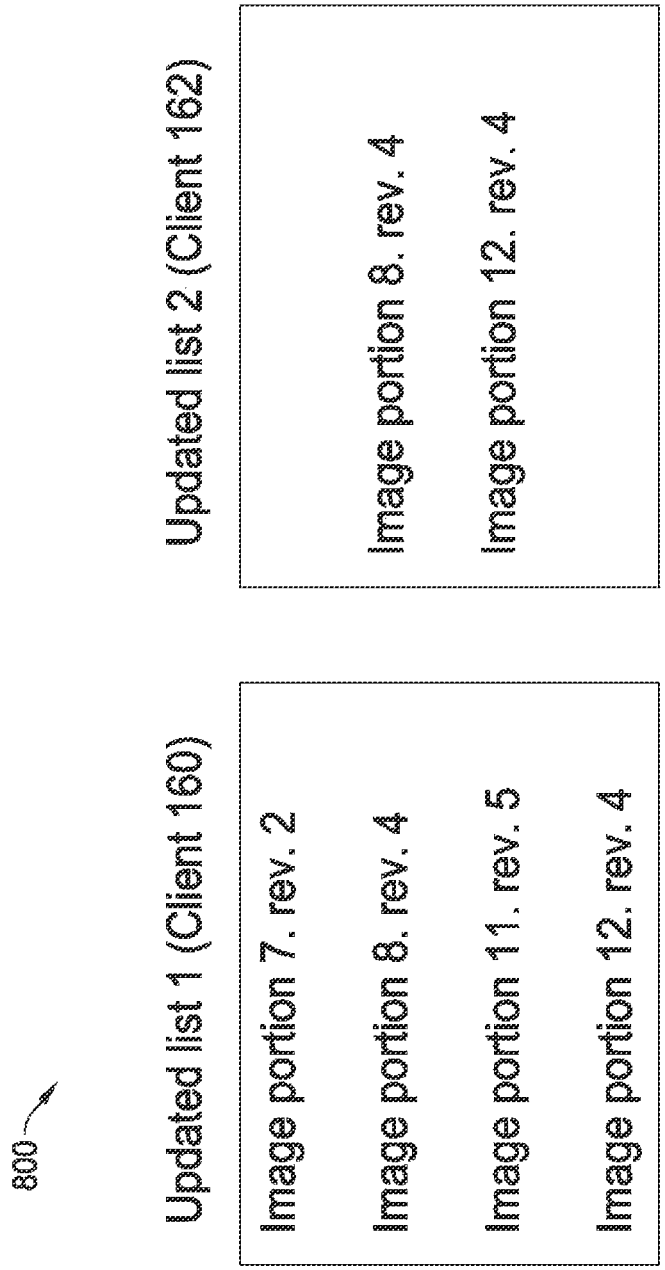
FIG. 8 is a block diagram of a portion of an exemplary output of a plurality of updated lists that are based on the updated image shown in FIG. 7.

Referring to FIG. 4, after the updated version numbers have been assigned, presence server 150 generates an updated list for each client 160 and 162 in operation 424 such that each updated list corresponds to a different client. For example, FIG. 8 illustrates a portion of an exemplary output 800 having updated list 1 that is generated for client 160 and updated list 2 that is generated for client 162, and each of the updated list 1 and updated list 2 are based on the revisions of image 500 (shown in FIG. 7). In some embodiments, each list includes the unique identifier 504 for the image portion on the left hand side of the list and the assigned updated version number 510 on the right hand side of the list. As described above, to handle clients 160 and 162 updating at different speeds, application server 172 only sends as much image data as each client can process. As such, in FIG. 8, the updated list for client 160 is different than the updated list for client 162. For example, updated list 1 is also based on the acknowledgements that application server 170 receives from client 160 regarding image portions that have already been updated. Similarly, updated list 2 is based on the acknowledgements that application server 170 receives from client 162 regarding image portions that have already been updated. Since client 160 is connected by way of a faster network, it is able to receive more updates on its updated list 1 than client 162. Client 162 can only handle the two updates identified and will receive the other updates later.

Referring to FIG. 4, in operation 425, application server 172 transmits updated image data to clients 160 and 161 separately, via respective networks 130 and 132, based on the updated list that is generated for each client. For example, application server 172 would transmit the image data to client 160 in the order specified by the updated list that was created for client 160 and would transmit the image data to client 161 in the order specified by the updated list that was created for client 161.

In operation 426, client 160 receives its corresponding updated image data and loads the updated image to a display device. In operation 428, client 162 receives its corresponding updated image data and loads the updated image to a display device. In operation 430, client 160 transmits an acknowledgement of receipt of image data to application server 172 and, in operation 432, client 162 transmits acknowledgement of receipt of image data to application server 172.

In operation 434, application server 434 receives acknowledgements and this step enables server 434 to know which version of the image portions each client 160 and 162 has received. As updates are received by application server 172, operations 421 to 434 are repeated. Moreover, in some embodiments, after receiving the image, each client 160 and 162 receive input from the user, including but not limited to mouse movements or keyboard interactions. When one client receives input from the user, the receiving client can transmit information about the output, such as the key that was pressed or the position of the mouse back to application server 172, wherein the input is applied to application being executed. If this input causes a change to the image of the application, the applications server then receives the update based on the change and operations 421 and 434 can be repeated such that the updates based on the change made by one of the clients can be shared with other client(s).

Since each client 160 and 162 receives image data from application server 172 based on the separate updated lists, a slow network connection for one client would not impact the other client receiving and displaying the updates. For example, if network 132 is slower than network 130, then client 162 would receive the image data portions corresponding to its updated lists at a relatively slower rate than client 160. However, client 160 would continue to receive the image data portions corresponding to its updated lists and can receive and display the image changes accordingly. There may be situations where client 160 may be updated with newer and/or more versions of updates than client 162 (as seen in FIG. 8). However, client 160 will continue to receive the most recent updates regardless of whether client 162 has received the most recent updates. Accordingly, system 100 is enabled to efficiently share and transmit image data to clients 160 and 162. Moreover, because the lists for each client 160 and 162 are created and/or changed independently, as the socket handler (not shown) for each client 160 and 162 has availability to send data, it takes the latest data for each position on the respective client's list. As such, each client 160 and 162 can receive at different rates while ensuring that the minimal data is sent to each client. Further, because a particular portion's unique identifier, such as identifier 504 (shown in FIGS. 5B and 7), can only be in each client's list once, each client 160 and 162 is enabled to receive the latest data and duplicates of the same data. If a given client's updated list includes a portion for which the client is two or more versions behind the most recent version, the server sends the client the most recent version of that portion of the image. Thus, obsolete image portion changes are not sent to the slower clients.

In some embodiments, application server 172 maintains the minimal set of data that is needed. The use of version numbers, such as numbers 506 and 510 (shown in FIGS. 5B and 7) enables the servers to recreate a new state from an old state by copying the old state and replacing only the updated data. Such a replacement facilitates effective processing and caching of data on each server. Moreover clients 160 and 162 can reuse previous processing (such as image conversion) for a given grid portion, such as portions 502 (shown in FIGS. 5A, 5B, and 7), and for a version number, such as version numbers 506 (shown in FIGS. 5B and 7).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present disclosure may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising at least one server configured to be in communication with a plurality of clients via a plurality of networks such that two or more of the plurality of clients are in communication with said at least one server via respectively different networks of the plurality of networks, wherein said at least one server is further configured to:
    divide an image into a plurality of portions;
    assign a respective version number to each of the plurality of portions;
    generate a respective list corresponding to each respective client of the plurality of clients, wherein each list includes the assigned version number corresponding to each respective portion;
    transmit image data to each of the plurality of clients separately, via its respective network, based on the respective list corresponding to that client;
    identify at least one of the plurality of portions that has changed;
    assign an updated version number to the identified at least one changed portion;
    generate a respective updated list for each respective one of the plurality of clients, wherein each of the plurality of updated lists includes the assigned updated version number;
    receive an acknowledgement from each of the plurality of clients separately, via its respective network, wherein the acknowledgment is based on at least one of the plurality of changed portions in the respective updated list received by the respective client;
    identify a speed of each client's respective network; and
    transmit updated image data corresponding to the at least one changed portion to each of the plurality of clients separately, via its respective network, based on the respective updated list corresponding to that client and the acknowledgement received from that client, wherein the amount of updated image data transmitted to each client corresponds to the identified speed of that client's respective network.

2. The system of claim 1, wherein said at least one server is further configured to assign a plurality of unique identifiers that include a plurality of numeric values to the plurality of portions such that each of the plurality of numeric values corresponds to a different portion of the plurality of portions.

3. The system of claim 1, wherein said at least one server comprises a presence server and a plurality of application servers, said presence server is configured to identify one of said plurality of application servers to perform the execution of the application.

4. The system of claim 3, wherein said presence server is configured to:
    receive a plurality of notifications from said plurality of application servers such that each of the plurality of notifications corresponds to a different application server of said plurality of servers;
    assign a respective numeric value to each one of the plurality of notifications, wherein each numeric value is based on at least one constraint variable; and
    select one of said plurality of application servers to perform the execution of the application based on the respective assigned numeric values.

5. The system of claim 4, wherein each of the plurality of notifications includes at least one parameter of said respective application server.

6. The system of claim 4, wherein the at least one constraint variable includes at least one of an operational field, an initialization function, or a scoring function.

7. The system of claim 1, wherein said at least one server comprises a presence server, at least one application server, and a web server, wherein said presence server is configured to:
    receive a request to execute an application from at least one of the plurality of clients;
    identify one of said plurality of application servers to perform the execution of the application; and
    transmit a request for application data to said web server for transmission to said identified application server and to at least one of the plurality of clients, wherein the application data includes profile information for the application such that said identified application server and the at least one client are enabled to configure the application based on the profile information.

8. The system of claim 7, wherein the profile information includes at least one of gesture mapping data, keyboard mapping data, screen configuration data, document integration data, or display information data.

9. A method of sharing image data, the method comprising:
  connecting at least one server to a plurality of clients via a plurality of networks such that two or more of the plurality of clients are in communication with the at least one server via respectively different networks of the plurality of networks;
  dividing an image into a plurality of portions via the at least one server;
  assigning a respective version number to each of the plurality of portions via the at least one server;
  generating a respective list corresponding to each respective client of the plurality of clients, wherein each list includes the assigned version number corresponding to each respective portion;
  transmitting image data to each of the plurality of clients separately, via its respective network, based on the respective list corresponding to that client;
  identifying at least one of the plurality of portions that has changed;
  assigning an updated version number to the identified at least one changed portion;
  generating a respective updated list for each respective one of the plurality of clients, wherein each of the plurality of updated lists includes the assigned updated version number;
  receiving an acknowledgement from each of the plurality of clients separately, via its respective network, wherein the acknowledgment is based on at least one of the plurality of changed portions in the respective updated list received by the respective client;
  identifying a speed of each client's respective network; and
  transmitting updated image data corresponding to the at least one changed portion to each of the plurality of clients separately, via its respective network, based on the respective updated list corresponding to that client and the acknowledgement received from that client, wherein the amount of updated image data transmitted to each client corresponds to the identified speed of that client's respective network.

10. The method of claim 9, further comprising assigning a plurality of unique identifiers that include a plurality of numeric values to the plurality of portions, via the at least one server, such that each of the plurality of numeric values corresponds to a different portion of the plurality of portions.

11. The method of claim 9, wherein connecting at least one server comprises connecting a presence server and a plurality of application servers to the plurality of clients.

12. The method of claim 11, further comprising identifying one of the plurality of application servers to perform the execution of the application via the presence server.

13. The method of claim 12, wherein identifying one of the plurality of application servers to perform the execution of the application comprises:
  receiving a plurality of notifications from the plurality of application servers such that each of the plurality of notifications corresponds to a different application server of the plurality of servers;
  assigning a respective numeric value to each one of the plurality of notifications, wherein each numeric value is based on at least one constraint variable; and
  selecting one of the plurality of application servers to perform the execution of the application based on the respective assigned numeric value.

14. The method claim 13, wherein each of the plurality of notifications includes at least one parameter of said respective application server.

15. The method of claim 13, wherein the at least one constraint variable includes at least one of an operational field, an initialization function, or a scoring function.

16. The method of claim 9, wherein connecting at least one server comprises connecting a presence server, at least one application server, and a web server to the plurality of clients.

17. The method of claim 16, further comprising:
  receiving a request to execute an application, via the presence server, from at least one of the plurality of clients;
  identifying one of the plurality of application servers to perform the execution of the application; and
  transmitting a request for application data to the web server for transmission to the identified application server and to at least one of the plurality of clients, wherein the application data includes profile information for the application such that the identified application server and the at least one client are enabled to configure the application based on the profile information.

18. The method of claim 17, wherein the profile information includes at least one of gesture mapping data, keyboard mapping data, screen configuration data, document integration data, or display information data.

19. At least one computer-readable storage medium having computer-executable instructions embodied thereon, wherein, when executed by at least one processor, the computer-executable instructions cause the at least one processor to:
  connect to a plurality of clients via a plurality of networks such that two or more of the plurality of clients are in communication with the at least one processor via respectively different networks of the plurality of networks, wherein the at least one computer storage medium includes non-transitory media and at least one of a nonvolatile medium, a removable medium, or a non-removable medium;
  divide an image into a plurality of portions;
  assign a respective version number to each of the plurality of portions;
  generate a respective list corresponding to each respective client of the plurality of clients, wherein each list includes the assigned version number corresponding to each respective portion;
  transmit image data to each of the plurality of clients separately, via its respective network, based on the respective list corresponding to that client;
  identify at least one of the plurality of portions that has changed;
  assign an updated version number to the identified at least one changed portion;
  generate a respective updated list for each respective one of the plurality of clients, wherein each of the plurality of updated lists includes the assigned updated version number;
  receive an acknowledgement from each of the plurality of clients separately, via its respective network, wherein the acknowledgment is based on at least one of the plurality of changed portions in the respective updated list received by the respective client;

identify a speed of each client's respective network; and transmit updated image data corresponding to the at least one changed portion to each of the plurality of clients separately, via its respective network, based on the respective updated list corresponding to that client and the acknowledgement received from that client, wherein the amount of updated image data transmitted to each client corresponds to the identified speed of that client's respective network.

20. The at least one computer-readable storage medium of claim 19, wherein the computer executable instructions further cause the at least one processor to assign a plurality of unique identifiers that include a plurality of numeric values to the plurality of portions such that each of the plurality of numeric values corresponds to a different portion of the plurality of portions.

21. A system comprising at least one server configured to be in communication with at least one client via a network, wherein said at least one server is further configured to:

divide an image that is based on an application being executed into a plurality of portions;

assign a plurality of version numbers to the plurality of portions such that each of the plurality of version numbers corresponds to a different portion of the plurality of portions;

generate a list that includes the assigned plurality of version numbers;

share the image with the at least one client by transmitting image data to the at least one client based on the list;

receive at least one update for the image;

identify at least one of the plurality of portions that has changed based on the at least one update;

assign an updated version number to the identified at least one changed portion;

generate an updated list for the at least one client, wherein the updated list includes the assigned updated version number;

receive an acknowledgement from the at least one client, via its respective network, wherein the acknowledgment is based on at least one of the plurality of changed portions in the respective updated list received by the at least one client;

identify a speed of each client's respective network; and transmit updated image data corresponding to the at least one changed portion to the at least one client based on the updated list and the acknowledgement received from the at least one client, wherein the amount of updated image data transmitted to the at least one client corresponds to the identified speed of the at least one client's respective network.

\* \* \* \* \*